(12) United States Patent
Aagaard et al.

(10) Patent No.: US 10,968,673 B2
(45) Date of Patent: Apr. 6, 2021

(54) LOW-PRESSURE FRICTION HINGE

(71) Applicant: Microsoft Technology Licensing, LLC, Redmond, WA (US)

(72) Inventors: Karsten Aagaard, Monroe, WA (US); Eric Paul Witt, Redmond, WA (US); Brian David Bitz, Woodinville, WA (US); Joseph Benjamin Gault, Seattle, WA (US); John Stephen Campbell, Spanaway, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 74 days.

(21) Appl. No.: 15/927,694

(22) Filed: Mar. 21, 2018

(65) Prior Publication Data
US 2019/0292827 A1    Sep. 26, 2019

(51) Int. Cl.
*E05D 11/08* (2006.01)
*G06F 1/16* (2006.01)
*H04M 1/02* (2006.01)

(52) U.S. Cl.
CPC .......... *E05D 11/082* (2013.01); *G06F 1/1616* (2013.01); *G06F 1/1681* (2013.01); *E05Y 2900/606* (2013.01); *H04M 1/0214* (2013.01)

(58) Field of Classification Search
CPC ....... E05D 11/082; E05D 3/06; G06F 1/1616; G06F 1/1681; G06F 1/1652; Y10T 16/53864; Y10T 16/547; Y10T 16/5464; Y10T 16/5474; Y10T 403/32614; Y10T 403/32081; Y10T 403/32032; Y10T 403/32016; Y10T 403/32639; Y10T 403/32811

See application file for complete search history.

(56) References Cited

U.S. PATENT DOCUMENTS

| | | | | |
|---|---|---|---|---|
| 936,379 A | * | 10/1909 | Stevens | F16M 11/40 248/160 |
| 2,642,018 A | * | 6/1953 | Weeber | A01G 9/241 52/277 |

(Continued)

FOREIGN PATENT DOCUMENTS

KR    20130073331 A    7/2013

OTHER PUBLICATIONS

Howse, Brett, "Design and the Dynamic Fulcrum Hinge", Retrieved From <<https://www.anandtech.com/show/9767/microsoft-surface-book-2015-review/2>>, Nov. 10, 2015, 7 Pages.

*Primary Examiner* — Victor D Batson
*Assistant Examiner* — Matthew J Sullivan
(74) *Attorney, Agent, or Firm* — Ray Quinney & Nebeker P.C.; Paul N. Taylor (57) ABSTRACT

A low-pressure hinge includes a plurality of segments with at least one upper frictional element and at least one lower frictional element where the at least one upper frictional element and the at least one lower frictional element are positioned on opposing sides of a segment of the plurality of segments. The hinge further includes a compression element that compresses the at least one upper frictional element and at least one lower frictional element against the segment with a compression force having a pressure less than 5,000 pounds per square inch.

24 Claims, 9 Drawing Sheets

(56) References Cited

U.S. PATENT DOCUMENTS

| | | | | |
|---|---|---|---|---|
| 3,570,579 | A * | 3/1971 | Matsushima | A47B 17/04 160/235 |
| 4,684,017 | A * | 8/1987 | Watanabe | A45D 33/22 16/265 |
| 4,949,927 | A * | 8/1990 | Madocks | F16M 11/40 248/160 |
| 5,463,794 | A | 11/1995 | Erland | |
| 6,223,393 | B1 * | 5/2001 | Knopf | G06F 1/1618 16/366 |
| 6,233,785 | B1 | 5/2001 | Tanahashi | |
| 6,408,486 | B1 * | 6/2002 | Saliba | E05D 15/242 16/225 |
| 6,510,589 | B2 * | 1/2003 | Schrage | E05D 3/12 16/225 |
| 6,574,836 | B1 | 6/2003 | Steeber et al. | |
| 6,736,852 | B2 * | 5/2004 | Callaway | A61F 2/4014 623/19.14 |
| 7,805,810 | B2 * | 10/2010 | Hoffman | E05D 3/127 16/354 |
| 8,869,353 | B2 * | 10/2014 | Hsu | E05D 3/14 16/364 |
| 8,914,946 | B2 * | 12/2014 | Hsu | F16H 21/44 16/342 |
| 8,931,141 | B2 * | 1/2015 | Chen | H04M 1/022 16/366 |
| 9,021,657 | B2 * | 5/2015 | Park | H05K 5/0226 16/354 |
| 9,557,776 | B1 * | 1/2017 | Oakeson | G06F 1/1679 |
| 9,606,583 | B2 * | 3/2017 | Ahn | G06F 1/1641 |
| 9,611,683 | B2 * | 4/2017 | Zhang | E05D 3/12 |
| 9,625,953 | B2 * | 4/2017 | Bitz | G06F 1/1681 |
| 9,703,328 | B2 | 7/2017 | Kim | |
| 9,748,720 | B2 * | 8/2017 | Huang | H01R 39/64 |
| 10,024,090 | B2 * | 7/2018 | Tazbaz | A45C 11/00 |
| 10,036,187 | B2 * | 7/2018 | Cheah | G06F 1/1681 |
| 10,067,530 | B2 * | 9/2018 | Tazbaz | E05D 3/06 |
| 10,082,838 | B1 * | 9/2018 | Hong | G06F 1/1681 |
| 10,120,421 | B1 * | 11/2018 | Hong | G06F 1/1681 |
| 10,162,389 | B2 * | 12/2018 | Tazbaz | G06F 1/1681 |
| 10,174,534 | B2 * | 1/2019 | Tazbaz | E05D 3/14 |
| 2010/0232100 | A1 * | 9/2010 | Fukuma | F16G 13/18 361/679.01 |
| 2015/0286286 | A1 * | 10/2015 | Jiang | G06F 3/0221 16/320 |
| 2016/0041589 | A1 | 2/2016 | Tazbaz | |
| 2016/0132075 | A1 | 5/2016 | Tazbaz | |
| 2017/0023984 | A1 | 1/2017 | Krahn | |
| 2018/0088634 | A1 * | 3/2018 | Bitz | E05D 3/06 |
| 2018/0183911 | A1 * | 6/2018 | Lee | H04M 1/02 |

* cited by examiner

LOW-PRESSURE FRICTION HINGE

CROSS-REFERENCE TO RELATED APPLICATIONS

N/A

BACKGROUND OF THE DISCLOSURE

Portable computing devices conventionally include at least one hinge to allow display and input surfaces to be oriented comfortably for a user, while balancing the mass of the computing device. In a conventional laptop, the upper portion of the laptop includes a display that presents visual information to a user. The visual information is generated by a processor and memory conventionally positioned in the lower portion of the laptop and sent to the display through one or more wires that cross the hinged joint between the lower portion and the upper portion. Similarly, the display is powered by a power supply stored in or connected through the lower portion of the laptop, and the power to operate the display is provided through the hinged joint.

The communication requirements, both electrical communication and data communication, across the hinged joint between the lower portion and upper portion of the laptop limit the amount of volume or surface area available for a friction hinge to hold the upper portion relative to the lower portion. Conventional friction hinges, therefore, use high pressures in the hinge to generate the intended amount of torque to hold the upper portion of the laptop in place. Conventional friction hinges for laptops typically have pressures in excess of 10,000 pounds per square inch (PSI) exerted on steel components to provide sufficient torque while allowing the user to move the hinge, as needed. The tolerances of manufacturing high-pressure hinges require more time and more expensive manufacturing techniques while using more expensive materials, as well.

SUMMARY

In some implementations, a hinge includes a plurality of segments with at least one upper frictional element and at least one lower frictional element where the at least one upper frictional element and the at least one lower frictional element are positioned on opposing sides of a segment of the plurality of segments. The hinge further includes a compression element that compresses the at least one upper frictional element and at least one lower frictional element against the segment with a compression force having a pressure less than 5,000 PSI.

In some implementations, an electronic device includes a first portion of the electronic device, a second portion of the electronic device, and a hinge connecting the first portion to the second portion. The hinge includes at least one segment positioned between the first portion and the second portion and configured to rotate about a rotational axis. The segment has a width at least 50% of a width of the first portion or second portion. The hinge further includes at least one upper frictional element contacting the at least one segment and at least one lower frictional element contacting the at least one segment. The at least one lower frictional element is opposite the at least one upper frictional element such that the upper frictional element and the lower frictional element apply a compression force to the at least one segment.

In some implementations, an electronic device includes a first portion of the electronic device, a second portion of the electronic device, and a hinge connecting the first portion to the second portion. The hinge includes a first segment and a second segment positioned between the first portion and the second portion and rotate about a first rotational axis and a second rotational axis, respectively. The hinge further includes at least one first upper frictional element contacting the first segment and at least one first lower frictional element contacting the first segment. The at least one first lower frictional element is opposite the at least first one upper frictional element such that the first upper frictional element and the lower frictional element apply a first compression force to the first segment. The hinge further includes at least one second upper frictional element contacting the second segment and at least one second lower frictional element contacting the second segment. The at least one second lower frictional element is opposite the at least one second upper frictional element such that the second upper frictional element and the second lower frictional element apply a second compression force to the second segment.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of implementations of the disclosure will be set forth in the description which follows, and in part will be obvious from the description, or may be learned by the practice of such implementations. The features and advantages of such implementations may be realized and obtained by means of the instruments and combinations particularly pointed out in the appended claims. These and other features will become more fully apparent from the following description and appended claims or may be learned by the practice of such implementations as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to devices, systems, and methods for providing a hinged joint. More specifically, the present disclosure relates to supporting an upper and lower portion of an electronic device with a hinged joint. A hinge may be positioned between two portions of an electronic device, such as a computing device. In some implementations, the electronic device may include or be a tablet computer, a hybrid computer, a laptop computer, or other portable personal computer. In further implementations, the electronic device may include or be a cellular telephone. In at least one implementation, a hinge may connect a first portion of a hybrid computer to a second portion of the hybrid computer.

A hinge according to the present disclosure may utilize a relatively low-pressure friction surface to produce a torque in the hinge. For example, the hinge may have friction surfaces that remain in contact during movement of the hinge and slide past one another while the hinge is in movement. The friction surfaces may be larger than those in a conventional laptop hinge, allowing the use of lower pressure on the friction surfaces to generate a comparable amount of friction, and hence torque, on the hinge. In some implementations, a hinge may include a plurality of segments with friction surfaces, allowing the hinge to have a plurality of rotational axes and allowing the fulcrum of the hinge to change during movement of the hinge.

Figure 1:
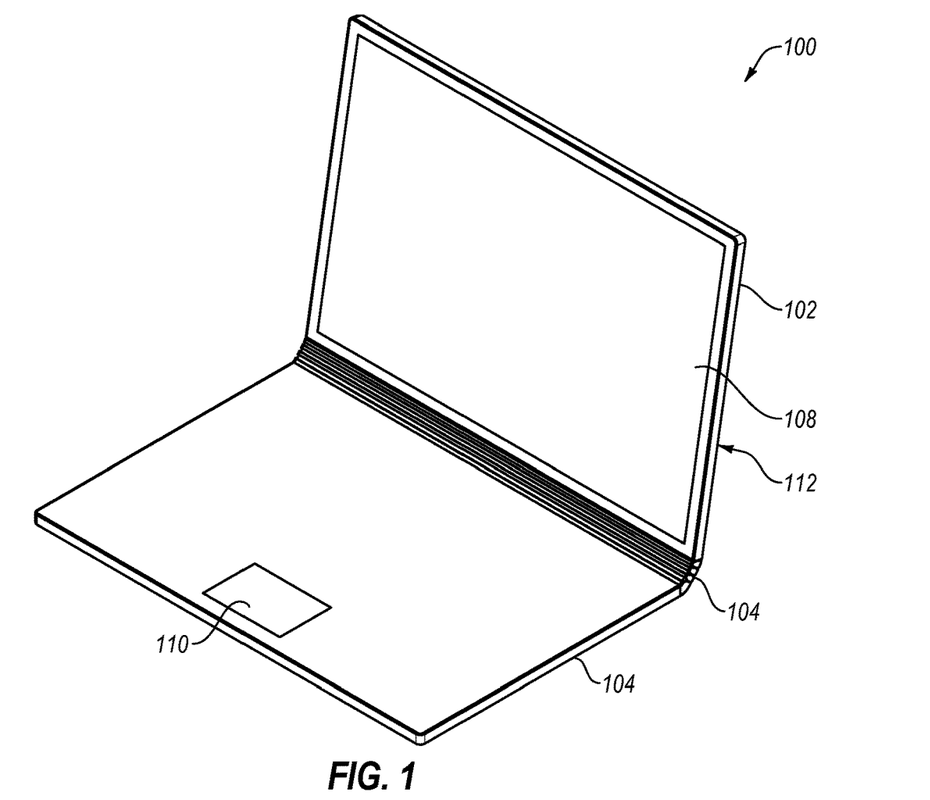
FIG. 1 is a perspective view of a computing device with a low-pressure hinge.

FIG. 1 is a perspective view of an implementation of a computing device 100. The computing device 100 may include a first portion 102 and a second portion 104 movably connected to one another by a hinge 106. In some implementations, the first portion 102 of the computing device 100 may include a display 108 to present visual information to a user and the second portion 104 of the computing device 100 may include one or more input devices 110, such as a trackpad, a keyboard, etc., to allow a user to interact with the computing device 100. In implementations in which the computing device is a hybrid computer, the first portion 102 may include the display 108 and at least a processor 112. The first portion 102 may further include additional computer components, such as a storage device, system memory, a graphical processing unit, graphics memory, one or more communication devices (such as WIFI, BLUETOOTH, near-field communications), peripheral connection points, etc. In some implementations, the first portion 102 may be removable from the hinge 106 and/or the second portion 104.

The hinge 106 may have a torque, or frictional resistance to movement, that allows a user to move the first portion 102 relative to the second portion 104 with a comfortable amount of force while also allowing the hinge 106 to support the first portion 102 at a variety of angles relative to the second portion 104 when the second portion 104 is resting on a horizontal surface such as a user's lap, a table, desk, countertop, or other surface. In some implementations, the hinge 106 may have a torque, or frictional resistance to movement that is about 1,000 Newton-millimeters (N-mm).

In other implementations, the hinge 106 may have a torque, or frictional resistance to movement, that is in a range of 450 N-mm to 1,500 N-mm.

Figure 2:
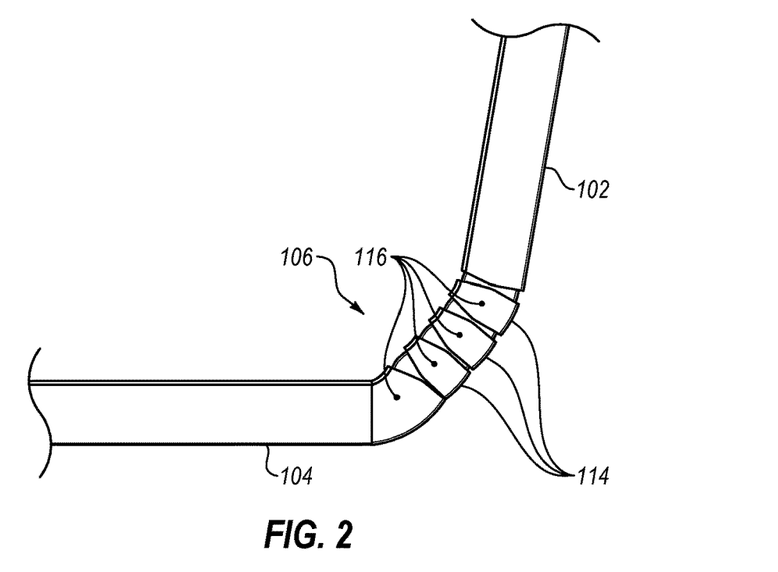
FIG. 2 is a side view of the low-pressure hinge of FIG. 1.

FIG. 2 is a side view of the implementation of a hinge 106 of the computing device 100 of FIG. 1. In some implementations, a hinge 106 may include a plurality of segments 114 connected to one another in series. The plurality of segments 114 may each have a rotational range of motion about a rotational axis 116. The rotational range of motion of the segments 114 about the rotational axes 116 may provide the hinge 106 with a total rotational range of at least 90° (i.e., the first portion 102 and second portion 104 being at a right-angle from one another), at least 120°, at least 135°, at least 150°, at least 180° (i.e., the first portion 102 and second portion 104 being laid flat and parallel to one another), at least 270° (i.e., the first portion 102 and second portion 104 being positioned at a right-angle from one another with the display 108 of FIG. 1 oriented outwardly in a tent arrangement for display purposes), or at least 360° (i.e., the first portion 102 and second portion 104 being parallel to one another with the display 108 of FIG. 1 oriented outwardly in a tablet arrangement).

Figure 3:
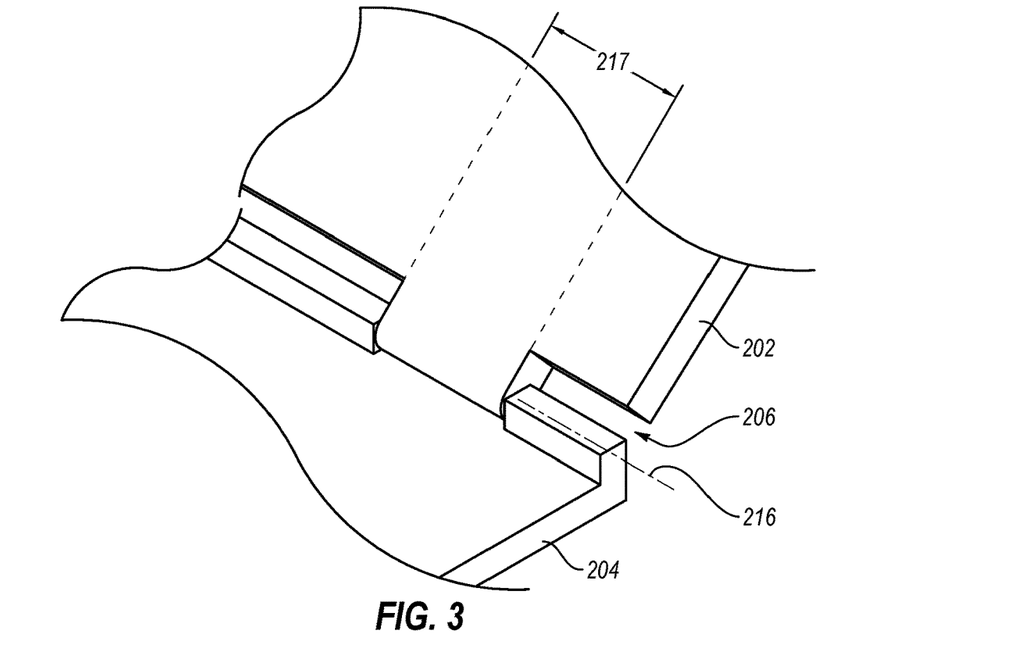
FIG. 3 is a perspective view of a conventional laptop hinge.
Figure 4:
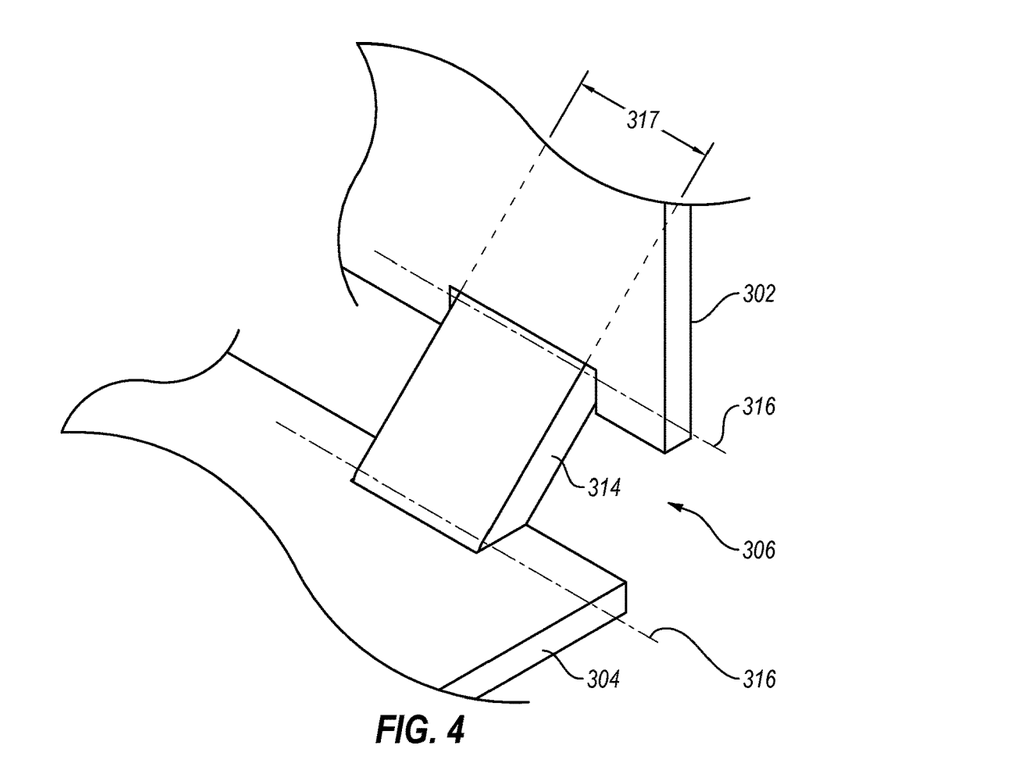
FIG. 4 is a perspective view of a conventional convertible laptop hinge.

FIG. 3 and FIG. 4 illustrate examples of conventional laptop hinges. For example, FIG. 3 illustrates a hinge 206 connecting a first portion 202 to a second portion 204. A conventional hinge 206 connects the first portion 202 to the second portion 204 about a single rotational axis 216. Conventional laptop hinges have a width 217 about 10 mm to about 25 mm. The conventional hinge 206 has friction surface pressures in excess of 15,000 PSI to generate the required friction with little size. A conventional hinge 206 includes high strength steel, metal injection molding steel (MIMS), or other high-strength and high wear-resistance materials to allow such high pressures and to maintain operational tolerances without loosening and losing pressure and friction.

Similarly, FIG. 4 is a perspective view of a conventional hinge 306 of a convertible laptop with a segment 314 positioned between the first portion 302 and second portion 304. The segment 314 has a plurality of rotational axes 316 that allows the convertible laptop to have a total range of motion of up to 360°. However, the friction generated by the hinge 306 about both of the rotational axes 316 is the same as the hinge 206 of FIG. 3 with approximately the same width 317. The contact surfaces around both of the rotational axes 316 of the convertible laptop hinge 306 are high-pressure interfaces to maintain the needed friction to hold the first portion 302 relative to the second portion 304.

Figure 5:
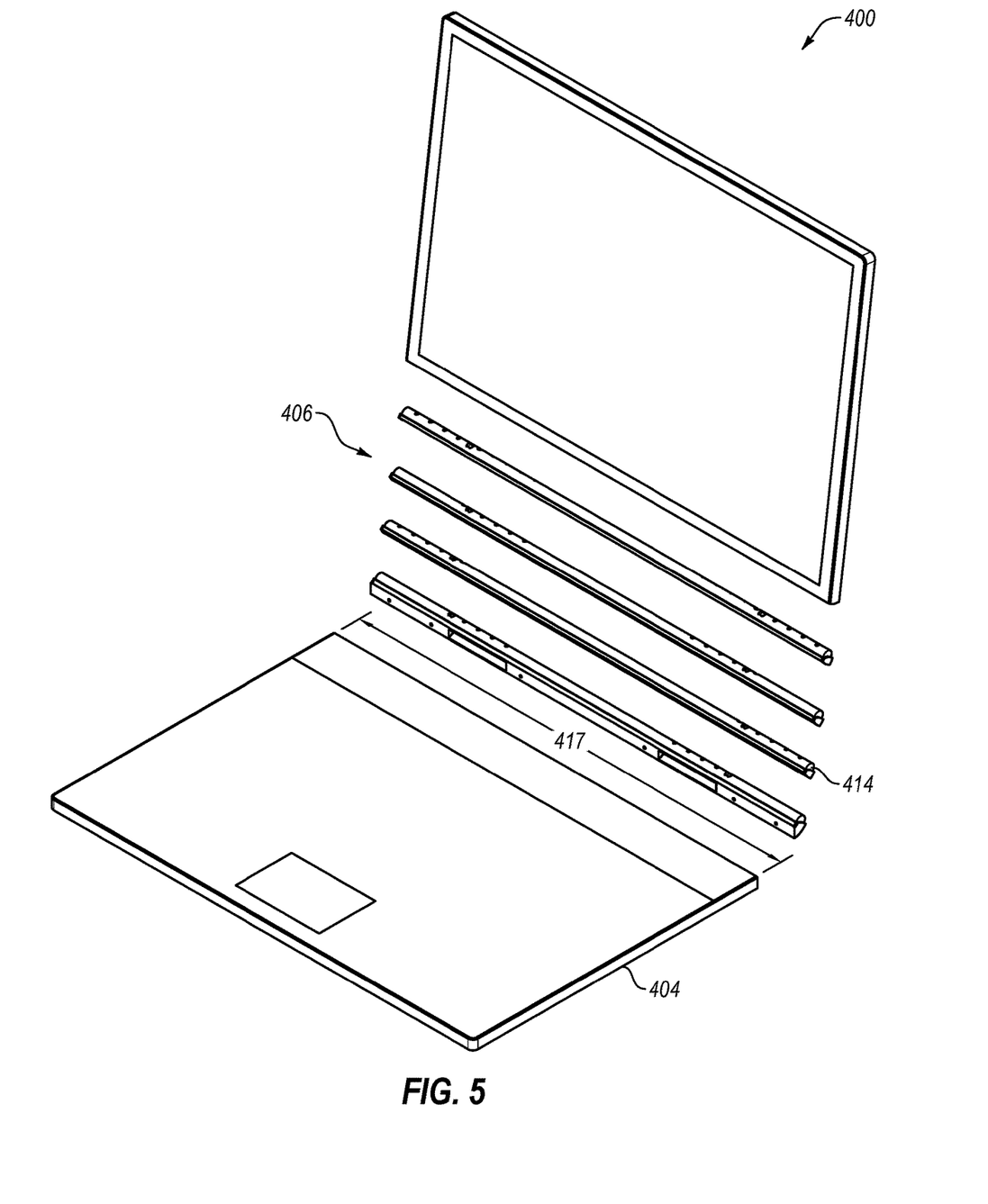
FIG. 5 is an exploded view of a low-pressure hinge having a plurality of segments.

FIG. 5 is a perspective exploded view of an implementation of a low-pressure hinge 406, according to the present disclosure. The hinge 406 may include a plurality of segments 414 where at least one of the segments 414 may have a width 417 that is approximately the full width of the first portion 402 and/or the second portion 404 of the computing device 400. In some implementations, the hinge 406 may have a width 417 that is less than the full width of the first portion 402 and/or the second portion 404 of the computing device 400. For example, the hinge 406 may have a width 417 that is at least 90% of the full width of the first portion 402 and/or the second portion 404 of the computing device 400. In other examples, the hinge 406 may have a width 417 that is at least 80% of the full width of the first portion 402 and/or the second portion 404 of the computing device 400. In yet other examples, the hinge 406 may have a width 417 that is at least 70% of the full width of the first portion 402 and/or the second portion 404 of the computing device 400. In at least one example, the hinge 406 may have a width 417 that is at least 50% of the full width of the first portion 402 and/or the second portion 404 of the computing device 400.

In the depicted implementation, the hinge 406 includes a plurality of segments 414 that extend the full width 417 of the hinge 406. In other implementations, the computing device 400 may include a plurality of hinges connecting the first portion 402 to the second portion 404. For example, the computing device 400 may have a first hinge proximate a left side of the first portion 402 and/or the second portion 404 and a second hinge proximate a right side (e.g., opposing side) of the first portion 402 and/or the second portion 404. It should be understood that in such implementations the width 417 of the hinge 406 may be the total width of all hinges connecting the first portion 402 to the second portion 404 of the computing device 400, as all portions of the hinge contribute to the friction of the hinge 406.

Figure 6:
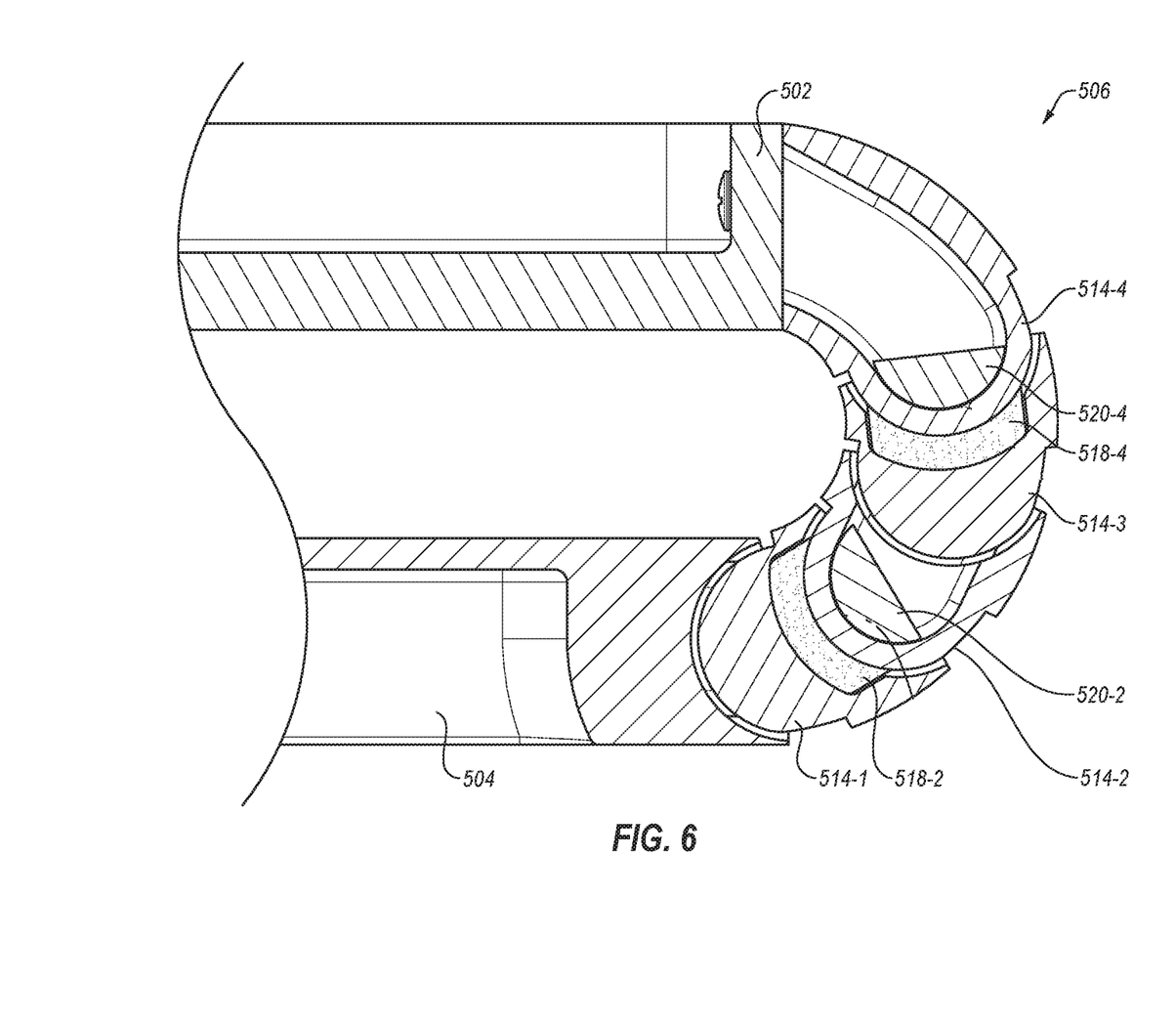
FIG. 6 is a side cross-sectional view of a low-pressure hinge.

At least partially due to the larger width 417 of a low-pressure hinge 406 (relative to a conventional hinge) according to the present disclosure, the interfaces between the segments 414 of the hinge 406 may have a lower contact pressure and still generate the intended friction about the hinge 406. FIG. 6 is a side cross-sectional view of an implementation of a hinge 506 according to the present disclosure connecting a first portion 502 to a second portion 504. Each segment 514-1, 514-2, 514-3, 514-4 may slide relative to one another on lower frictional elements 518-2, 518-4 and upper frictional elements 520-2, 520-4.

In some implementations, the lower frictional elements 518-2, 518-4 and upper frictional elements 520-2, 520-4 may compress a portion of a segment 514-1, 514-2, 514-3, 514-4 therebetween, and apply a frictional force thereto. For example, a first compression element (such as first compression element 524-1 shown in FIG. 8) may be positioned through the first segment 514-1 and compress a second lower frictional element 518-2 and second upper frictional element 520-2 against a second segment 514-2. While the first compression element 524-1 may be fixed in position relative to the first segment 514-1, a slot or elongated aperture in the second segment 514-2 may allow the second segment 514-2 to slide between the second lower frictional element 518-2 and second upper frictional element 520-2 and to rotate relative to the first segment 514-1 and first compression element.

Figure 8:
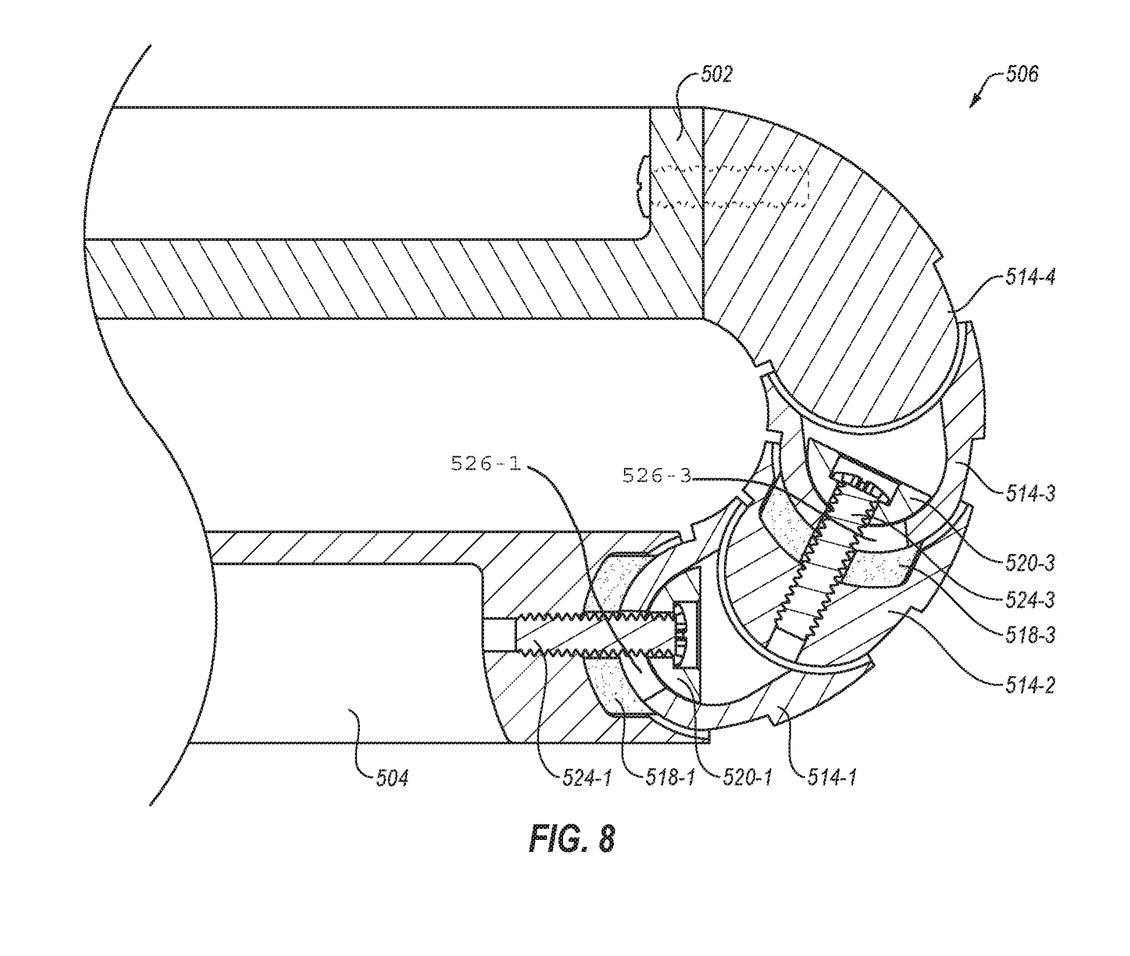
FIG. 8 is another side cross-sectional view of the low-pressure hinge of FIG. 6.

In another example, a third compression element (such as third compression element 524-3 shown in FIG. 8) may be positioned through the third segment 514-3 and compress a fourth lower frictional element 518-4 and fourth upper frictional element 520-4 against a fourth segment 514-4. While the third compression element may be fixed in position relative to the third segment 514-3, a slot or elongated aperture (as shown in FIG. 8) in the fourth segment 514-4 may allow the fourth segment 514-4 to slide between the fourth lower frictional element 518-4 and fourth upper frictional element 520-4 and to rotate relative to the third segment 514-3 and third compression element. Similarly, a second compression element may compress a third lower frictional element and third upper frictional element against the third segment 514-3.

Figure 7:
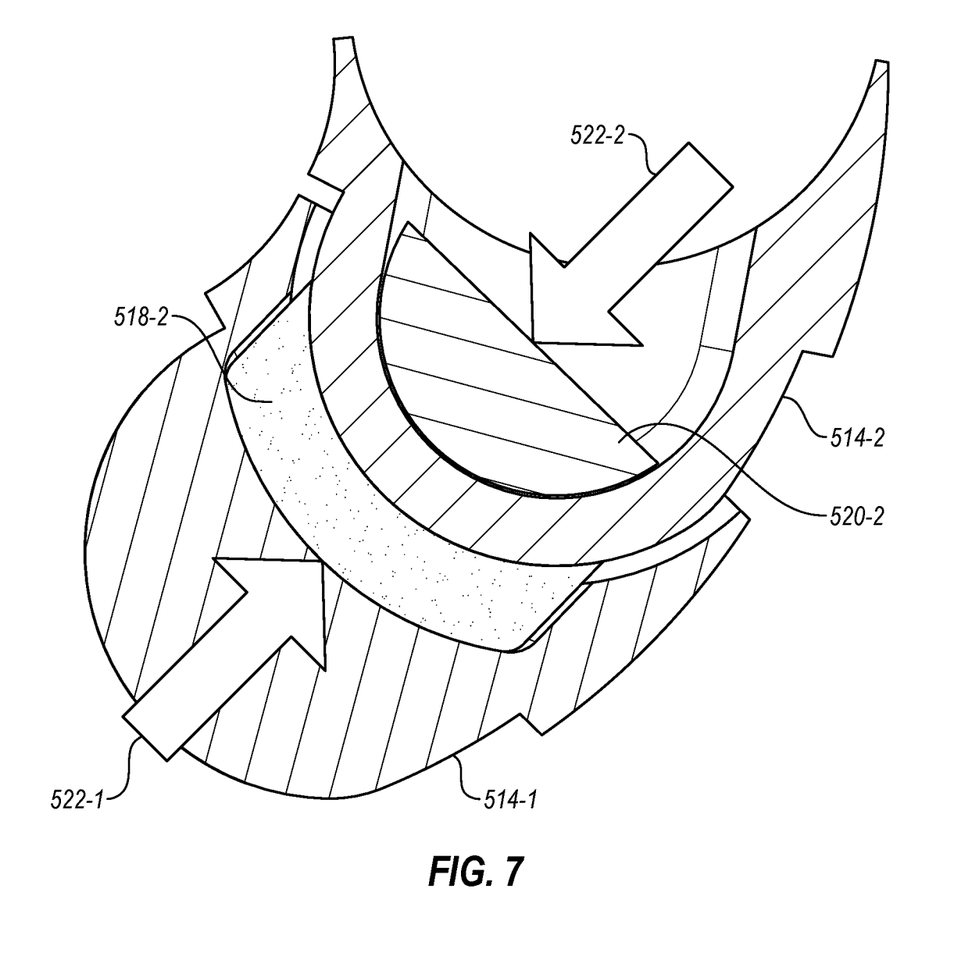
FIG. 7 is a schematic representation of frictional elements in a low-pressure hinge.

FIG. 7 is a schematic representation of the compression of the second lower frictional element 518-2 and second upper frictional element 520-2 against a portion of the second segment 514-2. As described in relation to FIG. 6, a compression element may apply a second compression force 522-2 to the second lower frictional element 518-2 and second upper frictional element 520-2. At least a portion of the second segment 514-2 may be positioned between the second lower frictional element 518-2 and second upper frictional element 520-2. The amount of friction force applied to the second segment 514-2 to resist the sliding and/or rotation of the second segment 514-2 relative to the first segment 514-1, second lower frictional element 518-2, and second upper frictional element 520-2 may be at least partially related to the magnitude of the second compression force 522-2.

Friction force is the normal force (the magnitude of the force normal to the friction surface) multiplied by the coefficient of friction of the materials in contact with one another at the friction surface. For example, the second compression force 522-2 illustrated in FIG. 7 may be less than the pressure applied to a friction surface in a conventional high-pressure hinge. In some implementations, each compression force applied by a compression element in a hinge according to the present disclosure may be approximately equal. In other implementations, at least one compression force may be less than another compression force. For example, a compression force may be less near the first portion of the computing device to reduce the friction at the rotational axis closest the first portion. In another example, a compression force may be less near the second portion of the computing device to reduce the friction at the rotational axis closest the second portion.

In some implementations, the second lower frictional element 518-2 may be felt. In other implementations, the second lower frictional element 518-2 may be brass. In yet other implementations, the second lower frictional element 518-2 may be any other material between with a coefficient of static friction between 0.05 and 1.00. For example, the second lower frictional element 518-2 may include a material having a coefficient of static friction in a range having an upper value, a lower value, or upper and lower values including any of 0.05, 0.10, 0.15, 0.20, 0.25, 0.30, 0.50, 0.75, 1.00, or any values therebetween. The second lower frictional element 518-2 may include a material with a coefficient of static friction greater than 0.05. The second lower frictional element 518-2 may include a material with a coefficient of static friction less than 1.00. The second lower frictional element 518-2 may include a material with a coefficient of static friction less than 0.50. The second lower frictional element 518-2 may include a material with a coefficient of friction less than 0.30.

In some implementations, the second upper frictional element 520-2 may be felt. In other implementations, the second upper frictional element 520-2 may be brass. In yet other implementations, the second upper frictional element 520-2 may be any other material between with a coefficient of static friction between 0.05 and 1.00. For example, the second upper frictional element 520-2 may include a material having a coefficient of static friction in a range having an upper value, a lower value, or upper and lower values including any of 0.05, 0.10, 0.15, 0.20, 0.25, 0.30, 0.50, 0.75, 1.00, or any values therebetween. The second upper frictional element 520-2 may include a material with a coefficient of static friction greater than 0.05. The second upper frictional element 520-2 may include a material with a coefficient of static friction less than 1.00. The second upper frictional element 520-2 may include a material with a coefficient of static friction less than 0.50. The second upper frictional element 520-2 may include a material with a coefficient of static friction less than 0.30.

In some implementations, the second lower frictional element 518-2 and the second upper frictional element 520-2 may be the same material. In other implementations, the second lower frictional element 518-2 and the second upper frictional element 520-2 may be different materials. For example, as described herein, the upper and/or lower frictional elements may include brass or felt. In other examples, the frictional elements may include other materials, such as foam, foam combined with polytetrafluoroethylene (such as materials marketed as RULON or TEFLON), leather, bronze, chrome plated steel, nickel plated steel, steel alloys, aluminum, or anodized aluminum.

In some implementations, the upper and lower frictional elements may be paired such that one of the upper frictional element and lower frictional element is a compliant frictional element and the other of the upper frictional element and lower frictional element is a relatively rigid frictional element. For example, pairing the frictional elements in this manner may allow for more reliable tuning of the rotational friction of the hinge. Additionally, the lower frictional element may be a rigid frictional element to function as a load-bearing element in the hinge. A compliant frictional element may include or be made of felt, foam, foam combined with polytetrafluoroethylene (such as materials marketed as RULON or TEFLON), leather, or combinations thereof. A rigid frictional element may include or be made of brass, bronze, chrome plated steel, nickel plated steel, steel alloys, aluminum, anodized aluminum, or combinations thereof.

In some implementations, the second lower frictional element 518-2 and the second upper frictional element 520-2 may include a compressible material. For example, the second lower frictional element 518-2 and the second upper frictional element 520-2 may include materials with a compressibility described as a pressure per percent deflection of the material. In some implementations, the second lower frictional element 518-2 and/or the second upper frictional element 520-2 may include a material with less than 500 PSI per 10% deflection. In other implementations, the second lower frictional element 518-2 and/or the second upper frictional element 520-2 may include a material with at least 500 PSI per 25%. In yet other implementations, the second lower frictional element 518-2 and/or the second upper frictional element 520-2 may include a material with a compressibility of between 10% and 25% at 500 PSI. In some implementations, the compressibility of the material in at least one of the frictional elements may allow the frictional elements to wear over time while maintaining a compression force and, therefore, maintain the friction force between the segment and the frictional element. In other implementations, the compressibility of the materials may allow for compliance in the frictional elements, reducing bounce of the first portion and second portion of the computing device relative to one another, creating a smoother operation of the hinge and better control over hinge movement.

FIG. 8 is a side cross-sectional view of the implementation of a hinge 506 of FIG. 6 in a different longitudinal location within the hinge 506 connecting the first portion 502 and second portion 504. In particular, the present view illustrates a cross-section through the hinge 506 that includes the compression elements 524-1, 524-3. In a selected longitudinal cross-section of the hinge 506, less than all of the compression elements 524-1, 524-3 may be visible. The compression elements 524-1, 524-3 may be staggered within the hinge 506 in the longitudinal direction, because the compression elements 524-1, 524-3 visible in a longitudinal cross-section may overlap other compression elements (such as a second compression element 524-2, described in relation to FIG. 6) to allow the compression elements 524-1, 524-3 to move within associated apertures 526-1, 526-3, respectively.

In some implementations, the rotational range of a segment 514-1, 514-2, 514-3, 514-4 may be limited by the angular length of the associated aperture. For example, the first segment 514-1 may have a first aperture 526-1 with a 90° angular length. The first segment 514-1 may therefore have a 90° rotational range relative to the first compression element 524-1 that compresses the first lower frictional element 518-1 and the first upper frictional element 520-1 towards one another and the first segment 514-1. Similarly, the third segment 514-3 may have a third aperture 526-3 with a 90° angular length. The third segment 514-3 may therefore have a 90° rotational range relative to the third compression element 524-3 that compresses the third lower frictional element 518-3 and the third upper frictional element 520-3 towards one another and toward the third segment 514-3.

In some implementations, at least one aperture of the hinge 506 may have an angular length in a range having an upper value, a lower value, or upper and lower values including any of 45°, 60°, 70°, 80°, 90°, 100°, 110°, 120°, 135°, 180°, or any values therebetween. For example, at least one aperture of the hinge 506 may have an angular length greater than 45°. In other examples, at least one aperture of the hinge 506 may have an angular length less than 180°. In yet other examples, at least one aperture of the hinge 506 may have an angular length between 45° and 180°. In further examples, at least one aperture of the hinge 506 may have an angular length between 60° and 120°. In yet further examples, at least one aperture of the hinge 506 may have an angular length between 75° and 105°.

Figure 9:
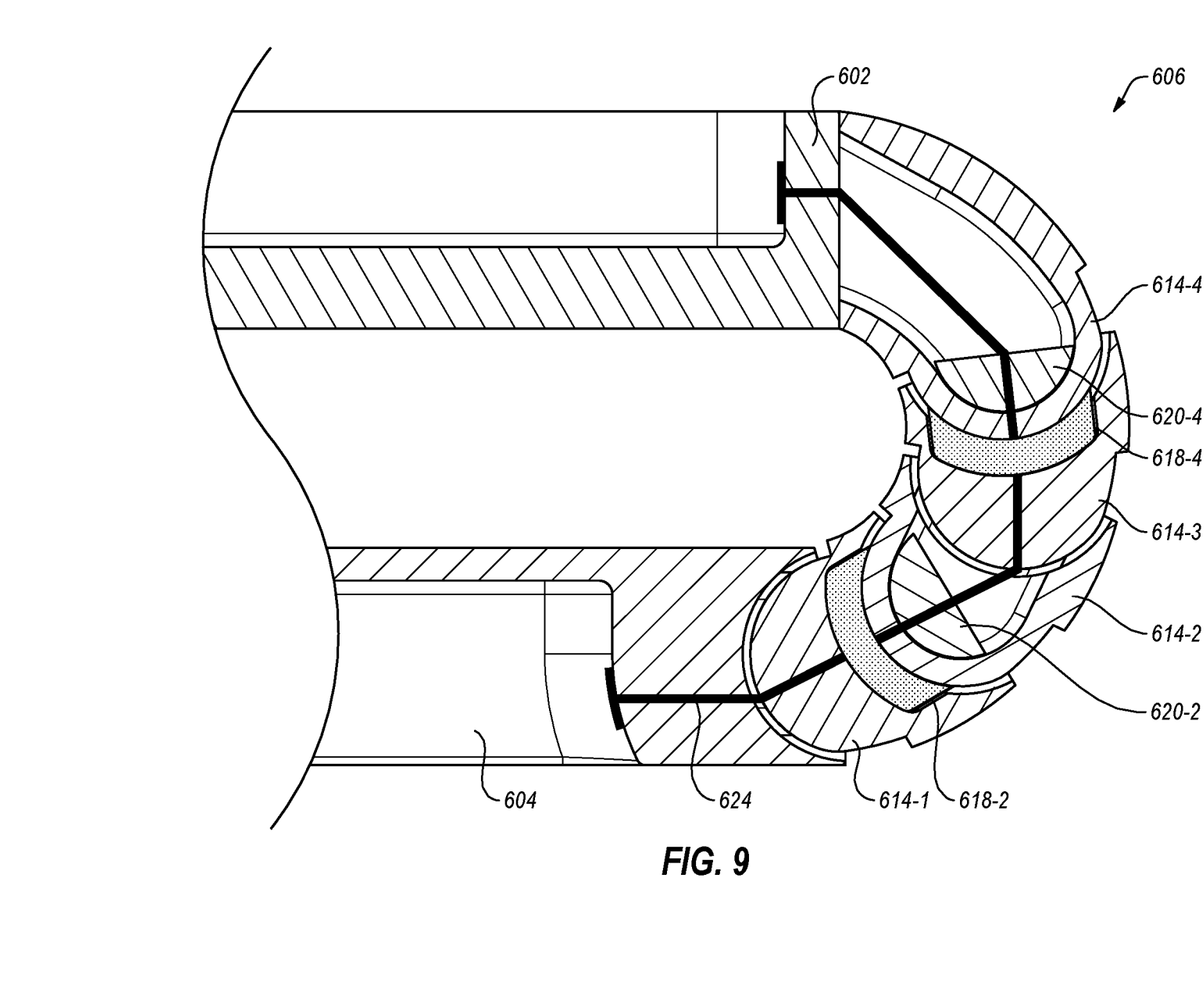
FIG. 9 is a side cross-sectional view of another low-pressure hinge.

FIG. 8 illustrates an implementation of a hinge 506 with compression elements that are threaded bolts. In other implementations, the compression elements may include springs, tensile elements, resilient elements, clips, clamps, screws, pins, rivets, or any other fastener or connector capable of applying a compression force. While FIG. 8 illustrates an implementation of a hinge 506 with a rigid compression element that are fixed relative to an individual segment 514-1, 514-2, 514-3, 514-4 and/or the first portion 502 or second portion 504, FIG. 9 is a cross-sectional view of another implementation of a hinge 606 with a flexible compression element 624, according to the present disclosure. For example, a flexible compression element 624 may include a cable, a wire, a thread, a spring, or other tensile element anchored at either end of the flexible compression element 624 to apply a compression force between the ends of the flexible compression element 624. For example, the flexible compression element 624 may be anchored at the first portion 602 and second portion 604 and be positioned through all segments 614-1, 614-2, 614-3, 614-4 of the hinge 606 therebetween. The flexible compression element 624 may provide a compression force between the first portion 602 and the second portion 604 through the segments 614-1, 614-2, 614-3, 614-4 of the hinge 606. The compression force of the flexible compression element 624 may connect and join the first portion 602, second portion 604, and hinge 606.

In some implementations, the flexible compression element 624 may provide compression through tensioning of the flexible compression element 624 upon anchoring to the first portion 602, second portion 604, or hinge 606. For example, the flexible compression element 624 may include an elastic material and/or structure (such as rubber, spring steel, a spring, or other resilient material and/or structure) such that the flexible compression element 624 may remain in tension after assembly of the hinge 606. In some examples, the spring may be one or more Belleville springs, extension springs, or other types of springs.

In other implementations, the flexible compression element 624 may apply a compression force after assembly by including a shape-memory material (SMM) in the flexible compression element 624. For example, a SMM wire may be positioned through the hinge 606 and subsequently transition from a first (longer) state of the SMM wire to a second (shorter) state of the SMM wire to tension the flexible compression element 624 after assembly.

In other examples, a flexible compression element may be anchored to one or more segments 614-1, 614-2, 614-3, 614-4 of the hinge 606 and a plurality of the flexible compression elements may, in series, connect and join the first portion 602, second portion 604, and hinge 606. In at least one example, a first flexible compression element may be anchored to the second portion 604 of the computing device and extend into and through the first segment 614-1, first lower frictional element and first upper frictional element (not shown in FIG. 9), the second segment 614-2, and the second lower frictional element 618-2 and second upper frictional element 620-2. In addition, a second flexible compression element may be anchored to the first segment 614-1 and third segment 614-3 through the second segment 614-2, and a third flexible compression element may be anchored to the third segment 614-3 and the first portion 602 through the fourth segment 614-4 and second lower frictional element 618-2 and second upper frictional element 620-2. In concert, the series of flexible connection elements may provide a compression force that is continuous through the first portion 602, second portion 604, and hinge 606.

In yet other examples, a hinge 606 may include flexible compression elements to connect and apply a compression force between at least two of the segments 614-1, 614-2, 614-3, 614-4 of the hinge 606, while the hinge 606 may have rigid connection members between the hinge 606 and the first portion 602 and/or second portion 604 of the computing device.

Figure 10:
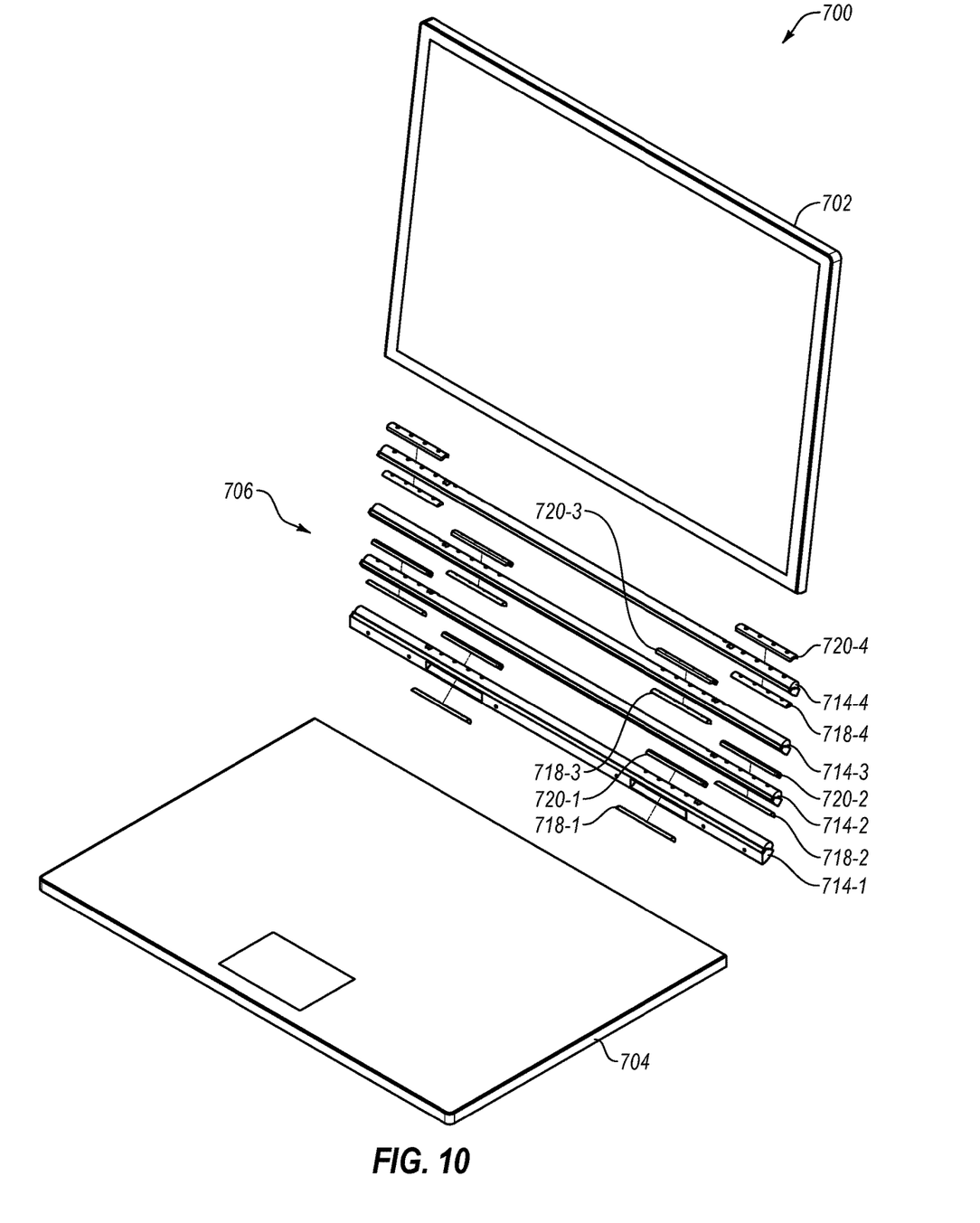
FIG. 10 is an exploded view of another computing device with a low-pressure hinge.

FIG. 10 is an exploded view of an implementation of a low-pressure hinge 706 connecting a first portion 702 to a second portion 704 of a computing device. The hinge 706 may include one or more frictional elements positioned between segments 714-1, 714-2, 714-3, 714-4 of the hinge 706. A plurality of frictional elements may be staggered through the hinge 706 such that pairs of lower frictional elements 718-1, 718-2, 718-3, 718-4 and upper frictional elements 720-1, 720-2, 720-3, 720-4 may be compressed on either side (e.g., opposing sides) of each respective segment 714-1, 714-2, 714-3. For example, between the first segment 714-1 and the second segment 714-2, a second lower frictional element 718-2 may be positioned longitudinally adjacent (i.e., adjacent in the direction along the width of the hinge 706) to a first upper frictional element 720-1. The second lower frictional element 718-2 may contact the second segment 714-2 and the first upper frictional element 720-1 may contact the first segment 714-2.

In some implementations, the first upper frictional element 720-1 may be longitudinally adjacent to another first upper frictional element 720-1, which may, in turn, be longitudinally adjacent to another second lower frictional element 718-2. In other implementations, the first upper frictional element 720-1 may be longitudinally adjacent to another second lower frictional element 718-2, which may, in turn, be longitudinally adjacent to another first upper frictional element 720-1 which may, in turn, be longitudinally adjacent to yet another second lower frictional element 718-2.

In some implementations, a hinge 706 may have 2, 3, 4, 5, 6, 7, 8, 9, 10 or more segments 714-1, 714-2, 714-3, 714-4, with 2, 3, 4, 5, 6, 7, 8, 10, 12, 15, 20, 25, 30, or more pairs of lower frictional elements 718-1, 718-2, 718-3, 718-4 and upper frictional elements 720-1, 720-2, 720-3, 720-4 associated with each segment 714-1, 714-2, 714-3, 714-4. For example, a hinge 706 allowing 360° of total rotational range of motion may include ten segments. In a particular example, a hinge 706 with ten segments 714-1, 714-2, 714-3, 714-4 and fifteen pairs of lower frictional elements 718-1, 718-2, 718-3, 718-4 and upper frictional elements 720-1, 720-2, 720-3, 720-4 may include 300 frictional elements.

Figure 11:
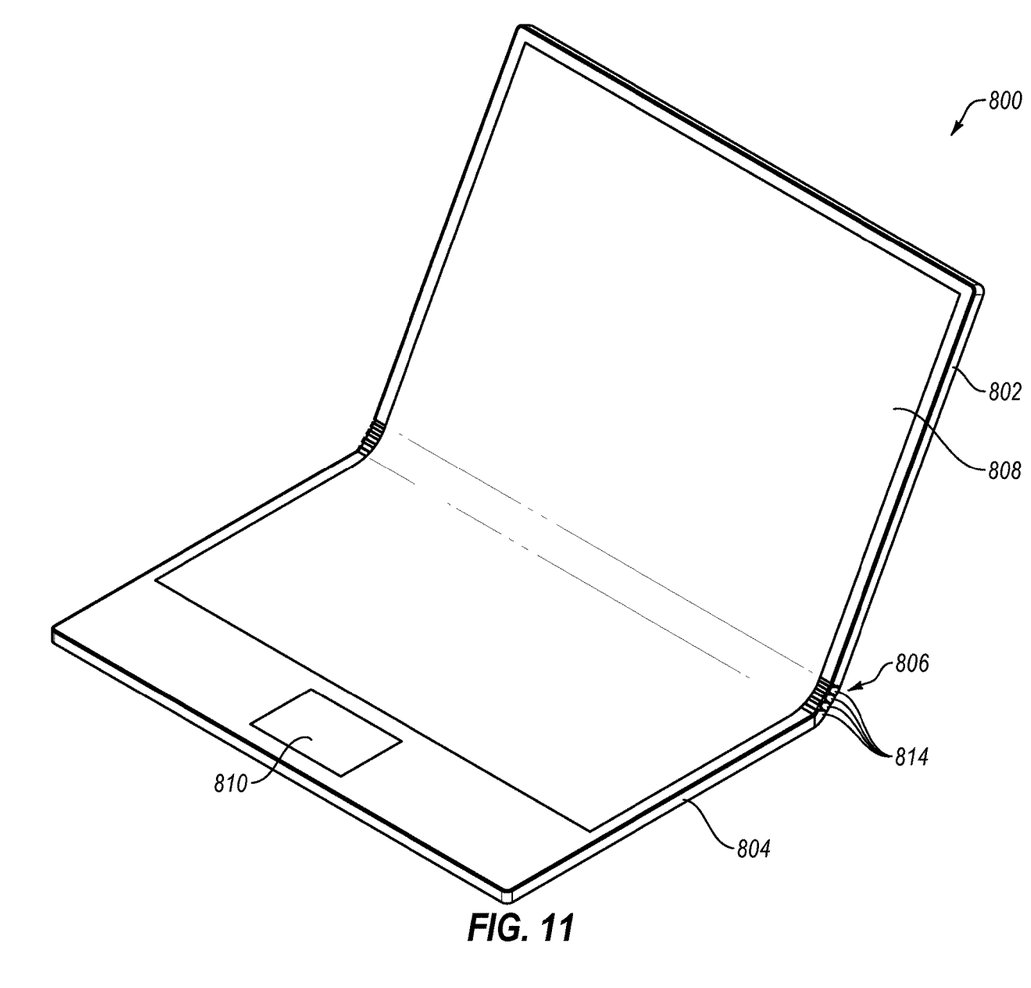
FIG. 11 is a perspective view of a computing device with a low-pressure hinge and a flexible display.

FIG. 11 is a perspective view of another implementation of a computing device 800 including a hinge 806 according to the present disclosure. A hinge 806 having a plurality of segments 814 may allow additional functionality to a computing device 800 beyond rotational movement of a first portion 802 and second portion 804. For example, a hinge 806 according to the present disclosure may have a continuous curve across substantially the full width of the computing device 800. In at least one implementation, the hinge 806 may provide a usable surface upon which and/or within which one or more components of the computing device 800 may be positioned. For example, a flexible display 808, such as an organic light emitting diode (OLED) display, may be positioned partially on the first portion 802, partially on the hinge 806, partially on the second portion 804, or combinations thereof. In other examples, one or more input devices 810 may be positioned partially on the first portion 802, partially on the hinge 806, partially on the second portion 804, or combinations thereof. For example, the display 808 may be a touch-sensing display that may be both a display 808 and an input device 810. In other examples, an input device 810 may be positioned along a side of the display 808 to allow scroll bar functionality.

In some implementations, a hinge according to the present disclosure may allow for a more reliable, more robust movable joint between first and second portions of a computing device with more readily sourced materials. A low-pressure hinge may provide improved performance of the hinge by reducing weight, increasing operational lifetime, and offering functional surface area that may be used for display, input, or other functionality.

One or more specific implementations of the present disclosure are described herein. These described implementations are examples of the presently disclosed techniques. Additionally, in an effort to provide a concise description of these implementations, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A hinge, the hinge comprising:
a plurality of elongate segments,
at least one upper frictional element;
at least one lower frictional element, where the at least one upper frictional element and the at least one lower frictional element are positioned on opposing sides of a segment of the plurality of segments and where the at least one upper frictional element and the at least one lower frictional element abut the segment of the plurality of segments and wherein the lower frictional element and upper frictional element are rotationally fixed relative to one another; and
a compression element that compresses the at least one upper frictional element and at least one lower frictional element against the segment with a compression force having a pressure less than 5,000 pounds per square inch (PSI).

2. The hinge of claim 1, a coefficient of friction between one or more of the at least one upper frictional elements or one or more of the at least one lower frictional elements and a segment of the plurality of segments having a coefficient of friction between 0.05 and 0.3.

3. The hinge of claim 1, one or more of the at least one upper frictional element or lower frictional element including felt, leather, foam, or polytetrafluoroethylene.

4. The hinge of claim 1, one or more of the at least one upper frictional element or lower frictional element including brass, bronze, steel, chrome, nickel, or aluminum.

5. The hinge of claim 1, the compression element being a flexible compression element.

6. The hinge of claim 1, further comprising a plurality of upper frictional elements and a plurality of lower frictional elements.

7. The hinge of claim 1, the hinge having a plurality of parallel rotational axes.

8. The hinge of claim 1, the hinge having a rotational frictional torque of between 450 newton-millimeters (N-mm) and 1500 N-mm.

9. An electronic device comprising:
a first portion of the electronic device;
a second portion of the electronic device; and
a hinge connecting the first portion to the second portion, the hinge including:
at least one elongate segment positioned between the first portion and the second portion and configured to rotate about a rotational axis, the hinge having a width at least 50% of a width of the first portion or the second portion,
at least one upper frictional element abutting the at least one segment, and
at least one lower frictional element abutting the at least one segment opposite the at least one upper frictional element such that the upper frictional element and the lower frictional element apply a compression force to the at least one segment and wherein the lower frictional element and upper frictional element are rotationally fixed relative to one another.

10. The electronic device of claim 9, the hinge having a width that is 100% of the width of the first portion or the second portion.

11. The electronic device of claim 9, further comprising a compression element configured to provide the compression force.

12. The electronic device of claim 11, the compression element being anchored to the first portion.

13. The electronic device of claim 12, the compression element being anchored to the second portion.

14. The electronic device of claim 11, the compression element being a flexible compression element.

15. The electronic device of claim 9, further comprising a display or an input device positioned at least partially on the hinge and at least partially on at least one of the first portion and the second portion.

16. An electronic device comprising:
a first portion of the electronic device;
a second portion of the electronic device; and a hinge connecting the first portion to the second portion, the hinge including:
  a first elongate segment positioned between the first portion and the second portion, the first segment configured to rotate about a first rotational axis to move relative to the second portion,
  at least one first upper frictional element abutting the first segment,
  at least one first lower frictional element abutting the first segment opposite the at least one first upper frictional element such that the first upper frictional element and the first lower frictional element apply a first compression force to the first segment and wherein the first lower frictional element and first upper frictional element are rotationally fixed relative to one another,
  a second elongate segment positioned between the first portion and the second portion, the second segment being positioned adjacent the first segment and configured to rotate about a second rotational axis to move relative to the first segment,
  at least one second upper frictional element contacting the second segment,
  at least one second lower frictional element contacting the second segment opposite the at least one second upper frictional element such that the second upper frictional element and the second lower frictional element apply a second compression force to the second segment and wherein the second lower frictional element and second upper frictional element are rotationally fixed relative to one another.

17. The electronic device of claim 16, the at least one first upper frictional element being adjacent the second lower frictional element.

18. The electronic device of claim 16, further comprising a compression element that is positioned in at least a portion of the first segment and at least a portion of the second segment.

19. The electronic device of claim 18, the compression element being positioned in an aperture of the second segment, the aperture having an arc measure of at least 45°.

20. The electronic device of claim 16, the first compression force and the second compression force being equal.

21. The hinge of claim 1, the hinge being elongate along one or more axes of rotation.

22. The electronic device of claim 9, one or more of the first portion or the second portion including a processor.

23. The electronic device of claim 1, the first portion including a display.

24. The electronic device of claim 9, the first portion including a display.

* * * * *